United States Patent [19]

Klein

[11] Patent Number: 4,483,909
[45] Date of Patent: Nov. 20, 1984

[54] ELECTROCHEMICAL CELL WITH PRESSURIZED LIQUID ELECTROLYTE

[75] Inventor: Gerhart P. Klein, Manchester, Mass.
[73] Assignee: Duracell Inc., Bethel, Conn.
[21] Appl. No.: 276,148
[22] Filed: Jun. 22, 1981
[51] Int. Cl.³ .............................................. H01M 4/00
[52] U.S. Cl. ..................................... 429/94; 429/174; 429/185; 429/196
[58] Field of Search ................. 429/196, 194, 94, 174, 429/185, 171–173

[56] References Cited

U.S. PATENT DOCUMENTS

| 2,826,681 | 3/1958 | Anthony et al. | 429/174 X |
| 3,715,239 | 2/1973 | Walker et al. | 429/94 X |
| 4,052,537 | 10/1977 | Mallory | 429/174 |
| 4,309,493 | 1/1982 | Kühl et al. | 429/174 X |

Primary Examiner—Charles F. LeFevour
Attorney, Agent, or Firm—Ronald S. Cornell; Israel Nissenbaum

[57] ABSTRACT

A method for filling an electrochemical cell can with a pressurized liquid electrolyte solvent and/or a liquid depolarizer. The method includes disposing an electrochemical cell system within a cell can having an open end, loosely positioning means for temporarily sealing the cell can between the open end of the cell can and the electrochemical cell system, and reducing the diameter of the open end of the cell can thereby confining the temporary sealing means between the electrochemical cell system and the open end of the cell can. The pressurized liquid electrolyte solvent and/or liquid depolarizer is introduced into the cell can. After the cell can is filled some of the electrolyte solvent and/or liquid depolarizer vaporizes. The resulting gas forces the temporary sealing means into temporary sealing engagement with the narrowed end of the cell can thereby substantially preventing loss of electrolyte solvent and/or liquid depolarizer from the cell can before the cell can is capped and permanently sealed.

3 Claims, 3 Drawing Figures

ELECTROCHEMICAL CELL WITH PRESSURIZED LIQUID ELECTROLYTE

FIELD OF THE INVENTION

The invention relates to electrochemical cells which are encased in containers of the type which are used in the aerosol industry and more particularly to a method of filling these cells.

BACKGROUND OF THE INVENTION

It has previously been discovered that electrical devices including electrochemical cells can be constructed using the technology of the aerosol industry. This discovery is set forth in U.S. Pat. Nos. 4,136,438 and 4,052,537 issued on Jan. 30, 1979 and Oct. 4, 1977, respectively, to the same assignee as the instant application and incorporated herein by reference.

Aerosol type cells are formed by placing an electrochemical cell system, including an anode and a cathode, into a cell can having an open end and introducing an electrolyte solvent and/or liquid depolarizer into the cell. The rim of the open end of the cell can is rolled inwardly into the shape of a torus. A cover having a lip portion that conforms generally to the shape of the torus is crimped radially outwardly beneath the torus to hold the cover on the end of the can and to seal the cell. An insulating material, disposed over the underside of the lip portion prior to crimping, insulates the cover from the can in the completed cell.

Aerosol technology has been found to be particularly well suited for manufacturing cells containing a pressurized, normally gaseous, liquefied electrolyte solvent and/or liquid depolarizer due to the many similarities between the physical properties of the preferred electrolyte solvent and/or liquid depolarizer (i.e. sulfur dioxide ($SO_2$)) and the propellants generally used in aerosol devices. Both types of materials are gases at room temperature and atmospheric pressure but are mixtures of pressurized gas and liquid within the aerosol container. Both can easily be liquefied by moderate pressure alone, moderate cooling alone or a combination of the two. Both cooling and the amount of pressure required for the liquefication of the electrolyte solvent and/or depolarizer and the aerosol propellants are easily achieved by known equipment. However, problems have arisen in the filling of the cell cans with the pressurized liquid electrolyte and/or liquid depolarizer and in the subsequent capping of the cell cans.

Aerosol devices are generally filled and capped within a sealed chamber. Filling and capping equipment is not usually affected by the aerosol propellants since the generally used propellants (such as fluorinated hydrocarbons, carbon dioxide or low boiling point hydrocarbons) are inert to the equipment used for filling and capping the aerosol cans. Liquid electrolyte solvents and/or liquid depolarizers, such as sulfur dioxide, however, can be corrosive. As a result, the interior of the filling chamber itself and the capping equipment within the filling chamber, which are not affected by ordinary propellants, may be corroded by the liquid electrolyte solvents and/or liquid depolarizers such as the sulfur dioxide used in electrochemical cells.

One method of filling the cell so that the capping procedure can be performed outside of the filling chamber (as disclosed in U.S. Pat. No. 4,052,537) with the capping equipment being removed from the corrosive atmosphere of the filling chamber is by chilling the gaseous electrolyte solvent and/or depolarizer material until it is a liquid and filling the container with the chilled liquid. Since the cold liquid electrolyte solvent and/or liquid depolarizer will remain a liquid until its temperature rises above its boiling point and the initial temperature can be controlled so that this temperature is not exceeded during normal filling and capping procedures, capping can be performed outside the filling chamber. A drawback of this method is that once the liquid electrolyte solvent and/or liquid depolarizer is in the cell can, it, without additional cooling, begins to absorb heat from the environment. The warming liquid electrolyte solvent and/or liquid depolarizer may begin to vaporize if capping is not completed with the precalculated time available for filling and capping. Further, the process of using chilled liquid electrolyte solvent and/or liquid depolarizer to fill cell cans requires first chilling and then maintaining the liquid electrolyte solvent and/or liquid depolarizer within the filling apparatus at a sufficiently low temperature to avoid gasification of the liquid therein. Such chilling is expensive, requiring costly equipment and large energy expenditures. Condensation further adds to the complexity and cost of the filling process.

THE INVENTION

A method has now been discovered for filling aerosol type electrochemical cell cans with a pressurized liquid electrolyte solvent and/or liquid depolarizer. The method comprises placing an electrochemical cell system, which includes an anode and a cathode, into a cell can. Means for temporarily sealing the cell can after filling is loosely positioned between the open end of the cell can and the electrochemical cell system. The diameter of the open end of the cell can is narrowed thereby confining the temporary sealing means in the space between the open end of the cell can and the electrochemical cell system. Within a suitable filling chamber, air is evacuated from the cell can and a pressurized liquefied electrolyte solvent and/or liquid depolarizer, which is normally a gas at room temperature and atmospheric pressure, is introduced into the cell can. After the desired quantity of pressurized liquid electrolyte solvent and/or liquid depolarizer has been introduced into the cell can some of the pressurized liquid electrolyte solvent and/or liquid depolarizer therein is permitted to become gaseous and the resulting gas pressure forces the temporary sealing means into a sealing relationship with the narrowed end of the cell can. Liquid pressurized electrolyte solvent and/or liquid depolarizer continues to become gaseous within the temporarily sealed cell can until equilibrium is reached.

The temporary sealing means is preferably sufficiently resilient so that when it is urged against the narrowed end of the cell can by the gas pressure within the cell can, the means readily conforms to the surface of the narrowed end of the cell can thereby forming a gas tight seal between the means and the narrowed end of the cell can. The temporary seal substantially prevents loss of the pressurized liquid electrolyte solvent and/or liquid depolarizer from the cell can whereby the cell can may be permanently sealed, as by capping, outside of the filling chamber. During capping there is only a slight exposure of the capping equipment to the corrosive gas evolved from the pressurized liquid electrolyte solvent and/or liquid depolarizer, since the temporary sealing means is only displaced from its sealing position by capping for a very short period of time resulting in the release of a minute quantity of gas from the cell can before final sealing by the cap. Since the capping equipment can be located outside of the filling chamber, the interior volume of the filling chamber is kept to a minimum thereby resulting in a minimal surface area of the chamber exposed to the corrosive gas evolved from the pressurized liquid electrolyte solvent and/or liquid depolarizer and a minimal quantity of gas is required to be removed from the filling chamber.

In the method of the present invention, the steps of placing the sealing means in the open end of the cell can, narrowing the cell can, and introducing the pressurized liquid electrolyte solvent and/or liquid depolarizer do not have to occur in any specific sequence. The sealing means may be placed into the open end of the cell can before or after the cell can is narrowed and the liquid electrolyte solvent and/or liquid depolarizer can be introduced into the cell container anytime before the cell container is capped.

The means for temporarily sealing the cell generally has a perimeter which is substantially the same configuration as the opening of the container. The means is generally somewhat larger than the opening of the container, but smaller than the interior of the container. This permits the pressurized liquid electrolyte solvent and/or liquid depolarizer to be introduced between the sealing member and the wall of the container and permits the member to readily sealingly engage the complete perimeter of the narrowed end of the cell can thereby forming a temporary but substantially complete seal between the sealing member and the narrowed end of the cell can.

The temporary sealing member can comprise a single material or alternatively a compositie of several materials with each adding desired qualities to the member. The member can have a uniform cross section or can have a non-uniform one adapted to best perform the desired functions of the member.

The sealing member can include reinforcing ribs along the underside (facing the electrochemical cell system) of the member. The ribs permit use of a thinner member or one made of a more flexible material than could otherwise be used. Generally, unreinforced, overly thin or overly flexible members would be ejected from the cell can after it is filled by the gas pressure within the cell. The same result can also be achieved by forming a raised lip or bead along the perimeter of the member. The raised lip or bead grips the portion of the torus or other narrowed part of the cell can facing the electrochemical system and holds the member in place within the cell can when gas pressure is applied to the member. The ribs, lip or bead can be integrally formed from the same material as the member, or can be adhered to or otherwise attached to the member. Alternatively, the member can be reinforced by an annular ring or washer which may be adhered to the member. The washer prevents the member from being ejected from the cell can.

A layer of material can be disposed on or near the portion of the member facing the narrowed end of the cell can to improve the seal between the member and the bottom surface of the torus. Such a layer may be necessary if the material from which the member is formed does not form an acceptable seal with the torus. The added material can be a rubber or other similar flexible material, inert to the electrolyte and other components of the cell, which can form a gas tight seal with the torus.

In the embodiment of the filling method wherein the member is placed into the cell can after its open end is narrowed, the member should be sufficiently deformable or flexible so as to pass through the narrowed end of the cell can when inserted, but sufficiently rigid that it not be ejected from the cell can after pressurization. Such a member can be formed from a single material or a composite of materials which are sufficiently flexible to be deformed for installation into the cell can without damage, but be sufficiently rigid so as not to be ejected by the subsequent pressure within the cell can. A member having such properties can also comprise one of the herein disclosed materials or a flexible loop or lip of greater perimeter than the inside perimeter of the narrowed end of the cell can, combined with a layer of flexible material completely bridging the loop or lip. The perimeter of the loop or lip can be temporarily reduced so that the member can be inserted through the narrowed open end of the cell can, but after insertion, the loop or lip regains its original shape. When the cell can is pressurized the loop or lip portion of the member contacts the surface of the narrowed end of the cell can holding the member in place in the cell can.

The temporary sealing member can be made using other materials and manufacturing techniques not disclosed herein. Such other members are also within the broad scope of the present invention.

The preferred temporary sealing member, is made of a somewhat resilient material inert to the other components of the cell and sufficiently rigid and thick to maintain the sealing relationship with the narrowed end of the cell can when subjected to the gas pressure within the cell produced by the pressurized liquid electrolyte solvent and/or liquid depolarizer. Sealing members not sufficiently rigid may be spontaneously ejected from the cell can or may flex sufficiently to weaker the seal and permit liquid electrolyte solvent and/or liquid depolarizer leakage. Materials for use as the preferred sealing member include polymeric plastics such as polyethylene, polypropylene and fluoroplastics such as polytetrafluoroethylene. The requisite dimensions of the sealing member are determined by the size of the cell opening (as a rule larger openings require thicker sealing members) and the type of material used. Since the preferred pressurized liquid electrolyte solvent and/or liquid depolarizer, sulfur dioxide ($SO_2$), remains a liquid at room temperature when kept at a pressure of about 35 kilograms per square centimeter, the sealing member should be able to remain in sealing relationship with the narrowed open end of the cell at least at such a pressure.

A preferred electrochemical cell system structure for use with the method of the present invention includes a convolutely wound anode and cathode electrodes with a separator therebetween. An anode or cathode current collector is preferably used in the electrochemical cell system. The current collector projects out from the wound electrodes towards the open end of the cell can and supports the temporary sealing member loosely in place above the wound electrodes prior to and during filling.

In such embodiment, when the cell is subsequently capped, the cap itself forces the current collector through the sealing member and into electrical contact with the cap. By electrically connecting either the anode or cathode to the current collector and the other to the cell can, the cap and cell can may be used as cell terminals. An insulator between the cell can and cap prevents short circuiting between the terminals.

In the preferred embodiments wherein a current collector is used which is forced through a temporary sealing member on capping, the sealing member should be comprised of a material, in the requisite dimensions, which provides the required seal at the required pressures and additionally is readily penetrated by the current collector on capping. The sealing member may be thinned, scored or the like in the area where the current collector is to penetrate to ease such penetration.

Alternatively the current collector can be in the form of a tube, a nail, a flat strip or bent strip of metal with the end of the current collector near the sealing member, being pointed or sharpened to facilitate its subsequent penetration of the member.

The current collector used in the preferred method of the present invention should be conductive, and of sufficient length to make electrical contact with the cover after capping. Further, the current collector should be sufficiently rigid so as to penetrate the sealing member without itself being damaged.

The invention will be better understood from the following discussion of the drawings which are intended solely to illustrate one embodiment of the invention.

DESCRIPTION OF THE DRAWINGS

Figure 1:
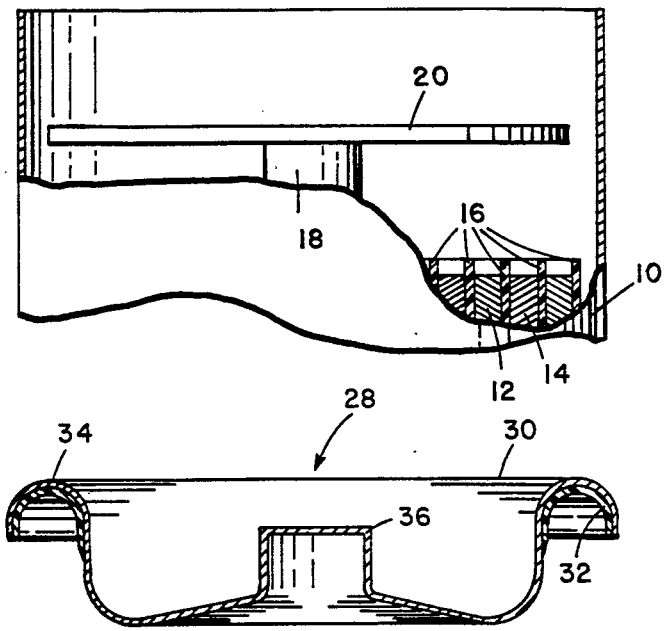
FIG. 1 is a partial cross section of a cell can before the open end thereof is narrowed.
Figure 2:
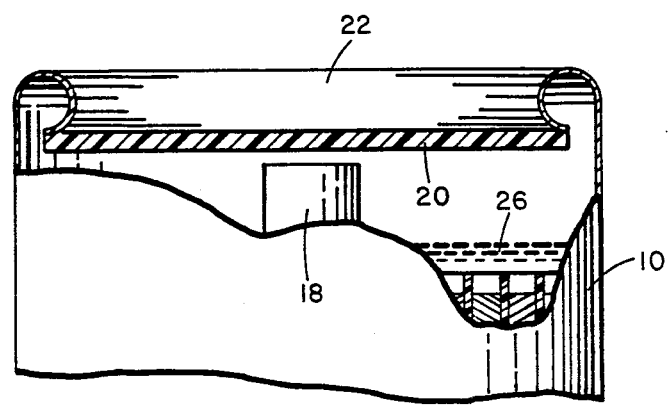
FIG. 2 is a partial cross section of the cell can after filling and prior to capping.
Figure 3:
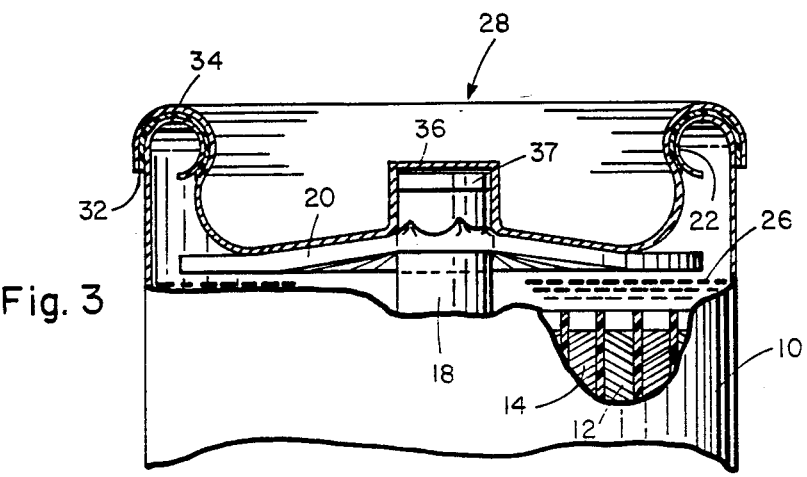
FIG. 3 is a partial cross section of the cell can after capping.

FIGS. 1-3 illustrate the method of the present invention. A cell can 10 is shown in FIG. 1 containing a preferred electrochemical cell system comprised of an anode 12, a cathode 14, and a separator 16 therebetween which are convolutely wound around an anode current collector 18. A temporary sealing member 20, supported by the current collector 18, is shown in place below the open end of the cell can 10. The diameter of the sealing member 20 is less than the inner diameter of the cell can 10.

The open end of the cell can 10 shown in FIG. 1 is narrowed by inwardly curling the open end of the cell can 10 into a torus 22, as shown in FIG. 2. The cell can 10 is evacuated and is filled with a pressurized liquid electrolyte solvent and/or liquid depolarizer within a filling chamber (or through the use of a filling head) (not shown). The pressurized electrolyte solvent and/or liquid depolarizer is introduced into the cell can 10 between the sealing member 20 and the torus 22 from a nozzle, tube or the like. After a metered quantity of the pressurized liquid electrolyte solvent and/or liquid depolarizer has been added to the evacuated cell can 10 and the filling completed, some of the pressurized liquid electrolyte solvent and/or liquid depolarizer within the cell can 10 vaporizes forming a gas, and forces the sealing member 20 up against the bottom of the torus 22 thereby temporarily sealing the cell can 10 shown in FIG. 2. The pressurized liquid electrolyte solvent and/or liquid depolarizer 26 continues to evaporate within the cell can 10 increasing the pressure therein until equilibrium is reached. The seal formed by the sealing member 20 and torus 22 substantially prevents loss of gaseous or liquid electrolyte solvent and/or liquid depolarizer 26 from the cell can 10 during subsequent permanent sealing of the cell can 10.

The cell can 10 is therefore capped by a cover assembly 28 shown separated in FIG. 2. The cover assembly 28 includes an electrically conductive cover 30 and an electrically insulating material 32 disposed on the underside of a lip portion 34 of the cover assembly 28. The cover 30 also includes a hollow cup portion 36 which mates with the current collector 18.

The cell can 10 is capped by forcing the cover assembly 28 down onto the open end thereof. As the cover assembly 28 is pressed onto the cell can 10, the sealing member 20 is pressed against the current collector 18 until it penetrates and passes through the sealing member 20 into the cup portion 36 of the cover assembly 28. The current collector 18 is frictionally engaged with the cap 36 to mechanically hold them together and electrically connect the cap 30 to the current collector 18.

When the current collector 18 has a cross section similar to that of the cup portion 36, that portion 37 of the sealing member above the current collector 18 can be separated from the sealing member on capping and remain in place between the top of the current collector 18 and the cup portion 36 as shown in FIG. 3. However, if the cross section of the current collector is smaller or of a different shape than the cup portion 36, or if the current collector is a flat or bent strip of metal (not shown) having a very small cross section, the current collector may simply pierce the sealing member without detaching any portion thereof.

After the cover assembly 28 is in place, the lip 34 of the cover assembly 28 is crimped over the open end of the cell can 10 by an expanding collet type crimping or similar machine. The insulative material 32 disposed on the underside of the cover assembly electrically separates the cell can 10 from the closure assembly 28. Further, the insulative material 32 seals the completed cell and prevent loss of gaseous or liquid electrolyte solvent and/or depolarizer 26, the temporary sealing member 20, as shown in the completed cell in FIG. 3, having been moved from its temporary sealing position by the capping. The sealing member 20 thereafter performs a second function by preventing shorting between either the anode 12 or cathode 14, and the cell closure 28 which can otherwise occur from loose conductive particles, dendrites or the like within the cell.

In a preferred embodiment of the method of the present invention the cell can 10 is formed from aluminum due to its nonmagnetic properties and its good workability. Other metals, such as stainless steel, may, however, also be used in the cell can 10.

A preferred cell can 10 for use with the method of the present invention is substantially cylindrical in shape and has a diameter of 3.8 centimeters which is similar to the standard "D" cell. The length of the cell can 10 may vary widely. However, preferred lengths are the same as or twice that of the "D" cell. These dimensions not only permit the use of aerosol technology and manufacturing equipment in forming and filling the cell but also permit cells manufactured using aerosol technology to be employed in many devices without modification of the devices. The method of the present invention is also applicable to filling aerosol cells having other dimensions.

The torus 22, which is generally formed after the electrochemical cell system and sealing member 20 are introduced into the cell can 10, may be formed by a punch press which curls the edge of the open end of the cell can 10 inwardly. The torus 22 for the preferred "D" cell sized can 10, is substantially circular, has a 2.5 centimeters inner diameter, and has a ring shaped cross section which is about 3.2 millimeters in diameter.

The temporary sealing member 20 used with the preferred "D" cell can 10 comprises a substantially circular disc which has a diameter of 3.3 centimeters, is 0.5 millimeters thick, and is made of polypropylene. Such a sealing member has been found to effectively seal the "D" cell can and is readily penetrated by the current collector.

The cell can may be filled with the pressurized liquid electrolyte solvent and/or liquid depolarizer through the use of aerosol industry equipment designed for use with corrosive pressurized liquids. A preferred apparatus includes a filling head which sealingly engages the torus or outside of the open end of the cell can. The equipment evacuates the cell can through the filling head and then introduces the pressurized liquid electrolyte solvent and/or liquid depolarizer from an aperture or nozzle in the filling head into the cell can. During the filling operation the sealing member remains in place on the current collector. However, after the cell can is filled with pressurized liquid electrolyte solvent and/or liquid depolarizer, and the filling head is disengaged from the cell can, gas pressure resulting from vaporizing pressurized liquid electrolyte solvent and/or liquid depolarizer within the cell below the sealing member forces it into sealing relationship with the torus.

The preferred electrochemical cell system depicted in the Figures are employed with the method of the present invention includes an active metal as the anode 12. The preferred active metal is an alkali or alkaline earth metal such as lithium. The cathode 14 used with the pressurized liquid electrolyte solvent and/or liquid depolarizer is preferably formed by applying a mixture of an inert and electrically conductive material such as carbon black, graphite, or other electrical conductors of high surface area with binding agents, onto a conductive screen (not shown). The cathode 14 is generally connected to the cell can 10 (not shown) making the cell can 10 one terminal of the cell.

The separators 16, between adjacent layers of anode 12 and cathode 14 preferably comprise a porous plastic material such as porous polypropylene. Other porous materials such as fibrous glass mats are also useful.

The preferred pressurized liquid electrolyte solvent and/or liquid depolarizer useful with the method of the present invention is sulfur dioxide ($SO_2$). Nonaqueous inorganic or organic solvents, which do not detrimentally react with the anode, cathode and pressurized liquid electrolyte solvent and/or liquid depolarizer can also be used in addition to the sulfur dioxide. Such solvents include esters, ethers, aldehydes, ketones, nitriles and amides. Preferred additional solvents include acetonitrile, propylene carbonate, tetrahydrofuran and dioxane.

Useful electrolyte solutes dissolved in the pressurized liquid electrolyte solvent and/or liquid depolarizer include halogen salts of the alkali and alkaline earth metals. Other metal halogen salts and other Lewis acids such as lithium tetrachloroaluminate, lithium hexafluorophosphate, and lithium aluminum chloride, to list only a few, are also useful.

It is understood that the above Figures and description are illustrative only and are not meant to limit the invention. Changes and variations can be made without departing from the spirit and scope of the present invention as defined in the following claims.

What is claimed is:

1. An electrochemical cell comprising a pressurized cell can having a narrowed open end; an electrochemical cell system disposed within the cell can, the electrochemical cell system including an anode and a cathode convolutely wound, a current collector projecting from the wound anode and cathode towards the open end of the cell can, and a pressurized liquid electrolyte solvent which is a gas at room temperature and atmospheric pressure, all operatively associated; one of said anode and cathode connected to the current collector, a cell cover crimped over the narrowed end of the cell can in electrical contact with the current collector; an insulative material disposed between the cell can and cover thereby electrically insulating the cell can from the cell cover; and an insulative member wider than the narrowed end of the cell can but narrower than the full internal diameter of the cell can disposed between the wound anode and cathode, and the narrowed end of the cell can; and the current collector having been forced through the member whereby electrical short circuits between either of said anode or cathode and the cell cover are prevented.

2. The cell of claim 1 wherein the anode comprises lithium.

3. The cell assembly of claim 1 wherein the pressurized liquid electrolyte solvent comprises sulfur dioxide.

* * * * *